INVENTORS
ROBERT M. CARTER
GEORGE L. PETRIK

*William Turner*

ATTORNEY

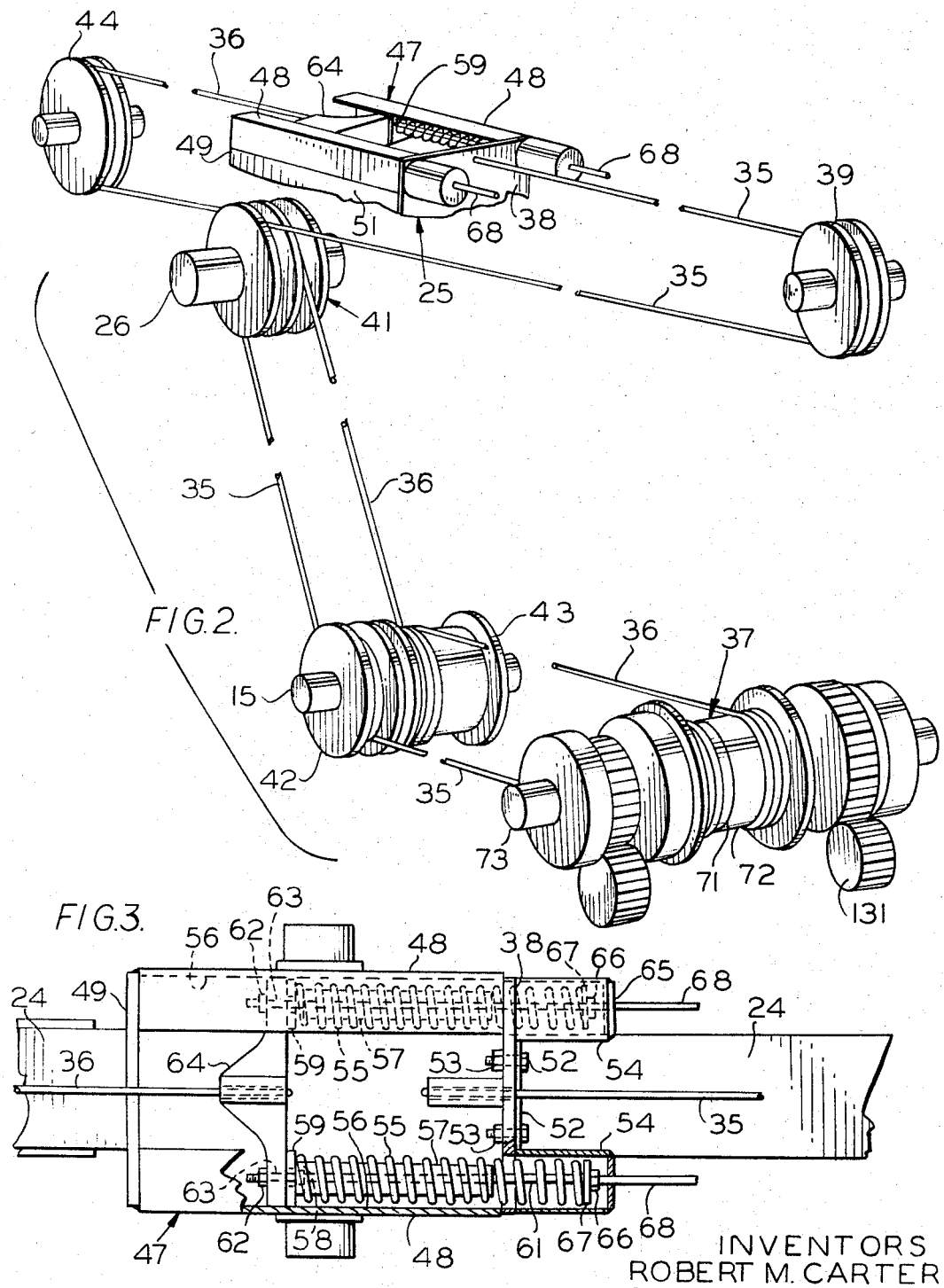

Oct. 10, 1967   R. M. CARTER ETAL   3,346,129
POWER SHOVEL
Filed Oct. 18, 1965   5 Sheets-Sheet 3

INVENTORS
ROBERT M. CARTER
GEORGE L. PETRIK
*William Turner*
ATTORNEY

Oct. 10, 1967

R. M. CARTER ETAL 3,346,129

POWER SHOVEL

Filed Oct. 18, 1965

INVENTORS
ROBERT M. CARTER
GEORGE L. PETRIK

*William Turner*

ATTORNEY

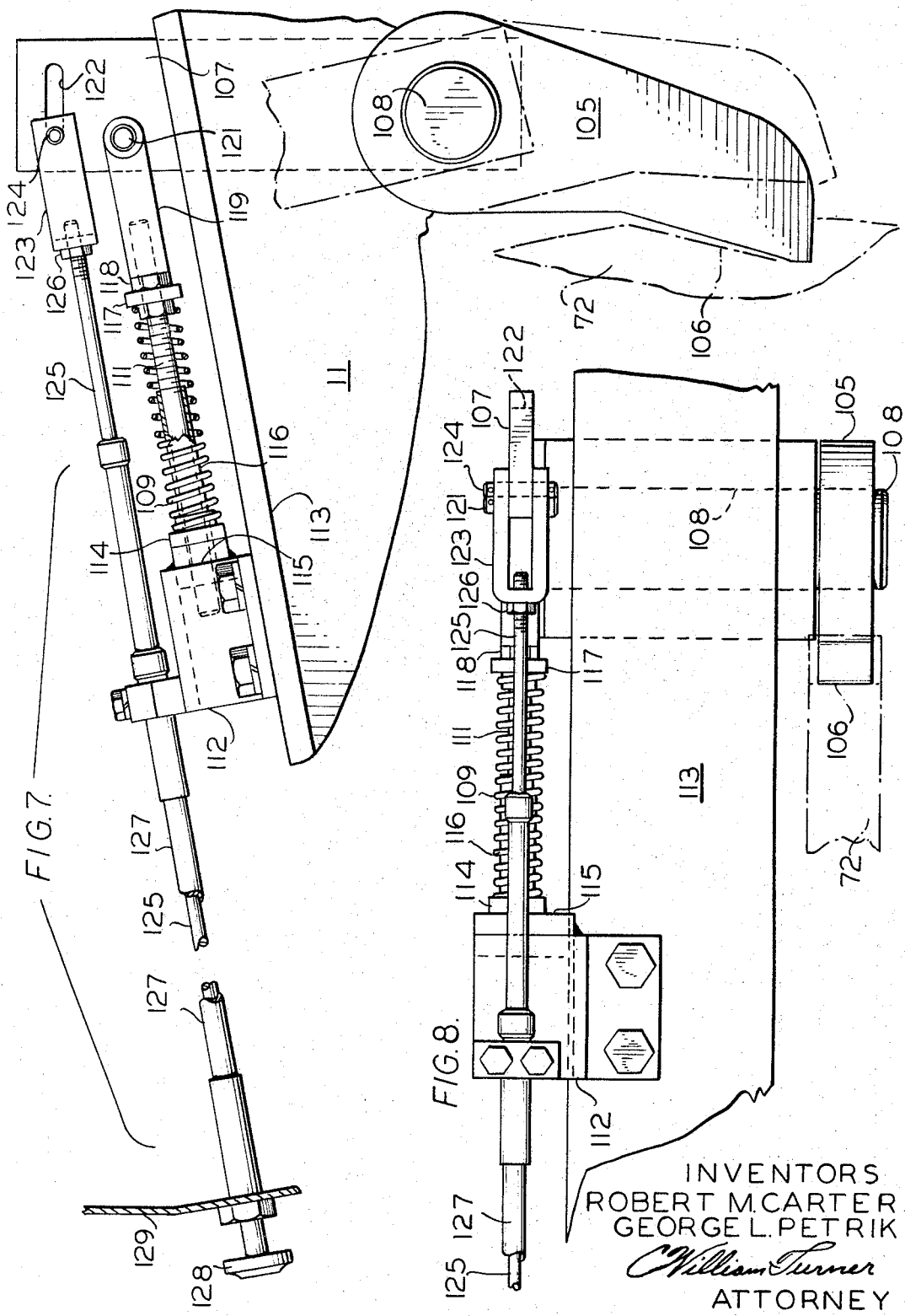

United States Patent Office 3,346,129
Patented Oct. 10, 1967

3,346,129
POWER SHOVEL
Robert M. Carter, and George L. Petrik, Cedar Rapids, Iowa, assignors to Link-Belt Company, a corporation of Illinois
Filed Oct. 18, 1965, Ser. No. 497,231
11 Claims. (Cl. 214—135)

ABSTRACT OF THE DISCLOSURE

A power shovel employing a crowd and rerack drum mechanism adapted to automatically tighten the tension in the crowd and rerack cables associated therewith upon actuation by the power shovel operator.

---

This invention relates generally to improvements in power shovels, and more particularly to an improved take-up device for the crowd and rerack cables of a power shovel.

During the normal operation of a power shovel the cables controlling the reciprocating movement of the dipper stick are constantly being wound on and payed off a drum driven by a drum drive mechanism. These cables are wound in opposite directions about the drum such that as one cable is wound onto the drum, an equal length of the other cable is simultaneously payed off the drum, thereby controlling the reciprocating longitudinal movements of the dipper stick in its crowding out and racking in operations. As these cables stretch through use it is necessary to tighten them so as to take up the slack therein, thereby restoring the cable tension required for the proper operation of the power shovel. This is a time consuming and laborious operation which removes the power shovel from operative use each time a tightening of the cable tension is required. Due to the nature of this equipment it is important that it can be adjusted and returned to use as quickly as possible so as to avoid repetitive and excessive costs.

It is therefore a primary object of this invention to provide an improved apparatus for tightening the crowd and rerack cables on a power shovel.

Another object of this invention is to provide a powered apparatus for tightening the crowd and rerack cables.

A further object of this invention is to provide an improved apparatus by means of which the crowd and rerack cables may be quickly and easily tightened from the power shovel operator's position by using the power from the crowd and rerack cable drive mechanism.

Still another object of this invention is to provide an apparatus for indicating to the power shovel operator when the crowd and rerack cables have been tightened to their proper tension.

Other objects and advantages of the invention will be apparent during the course of the following description.

Figure 1:
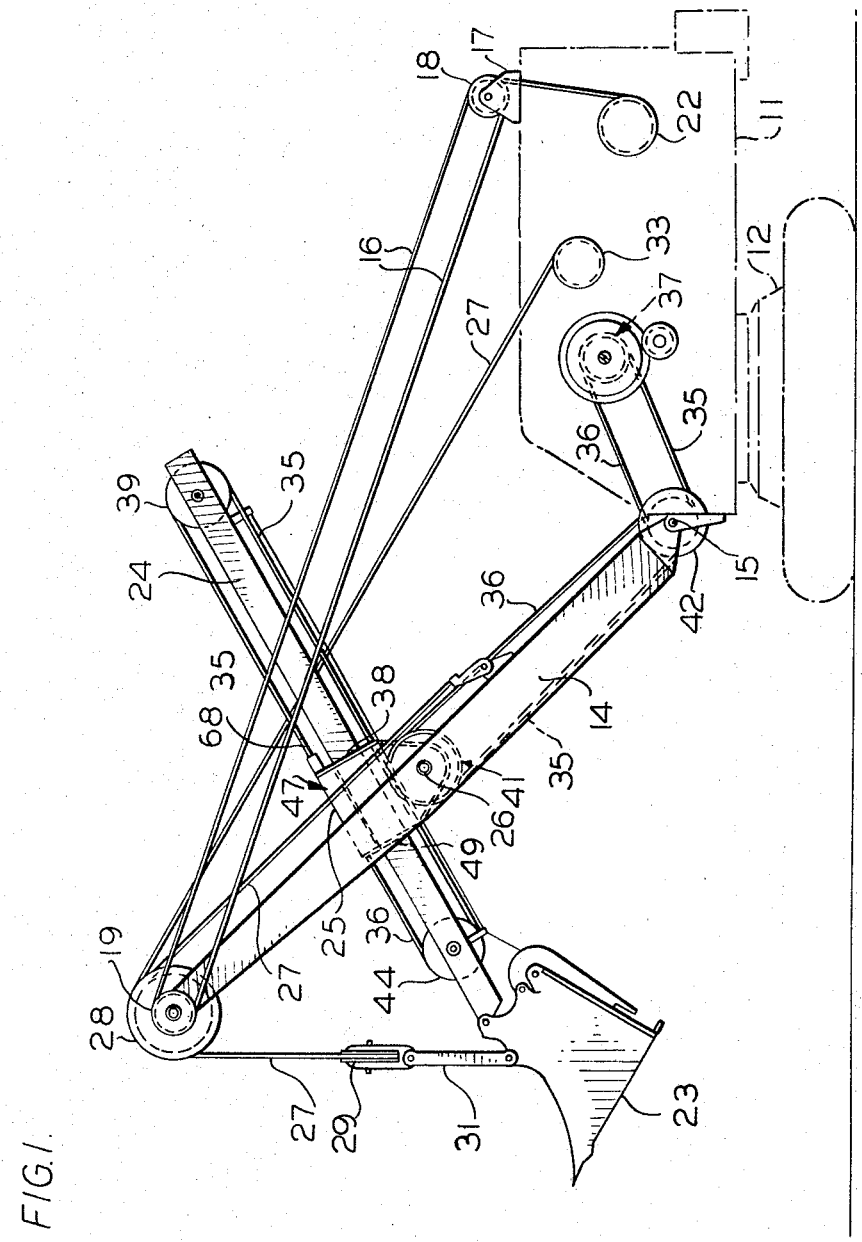
Figure 4:
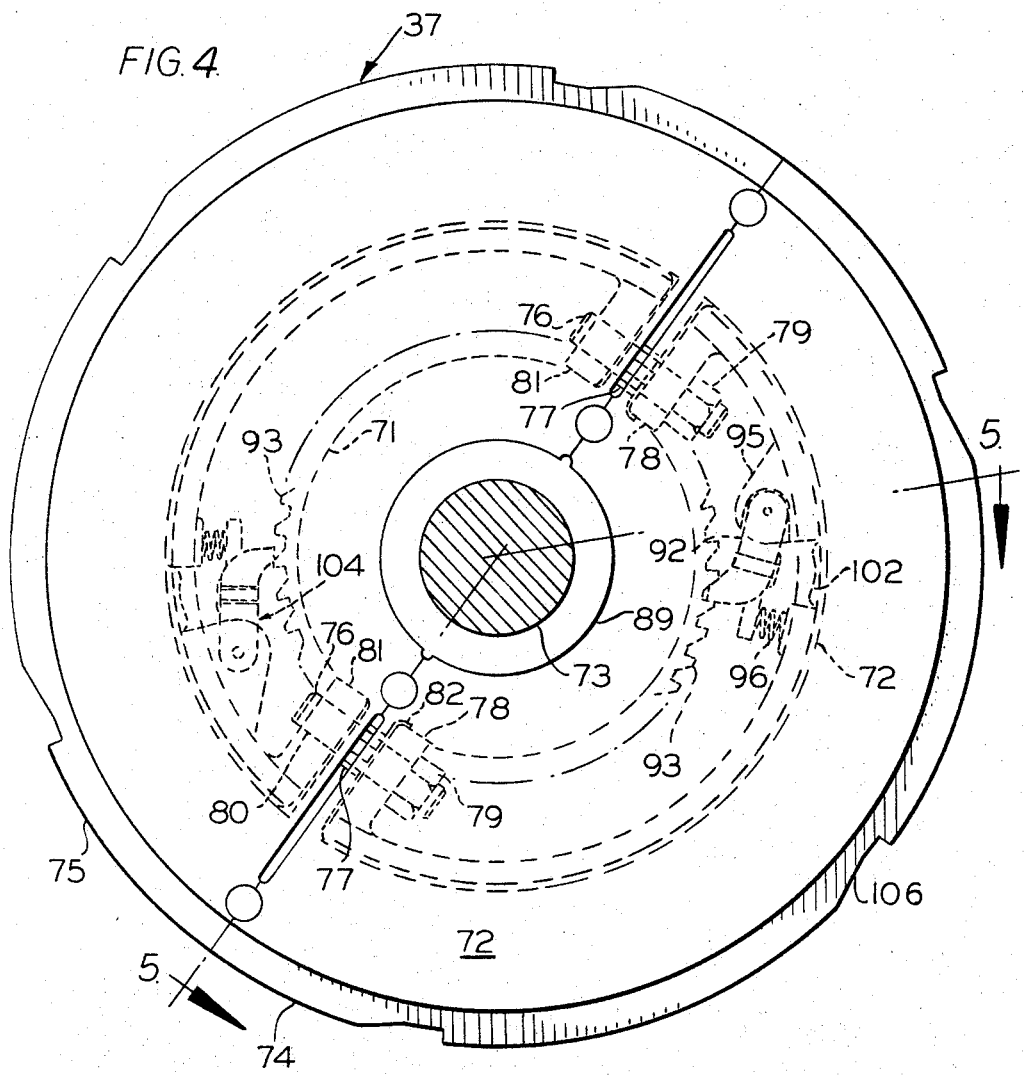
Figure 6:
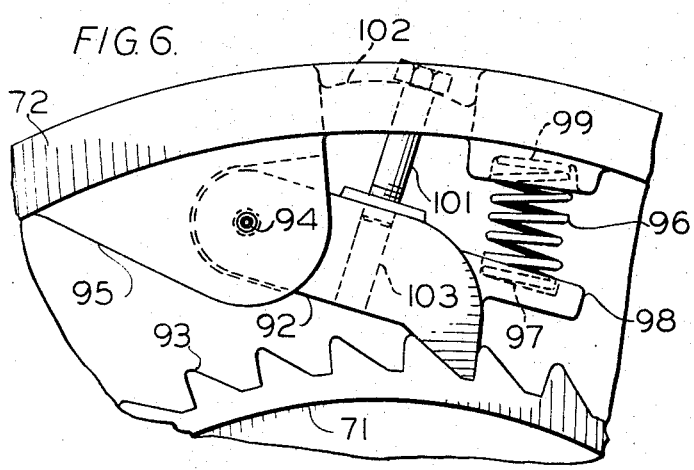
Figure 5:
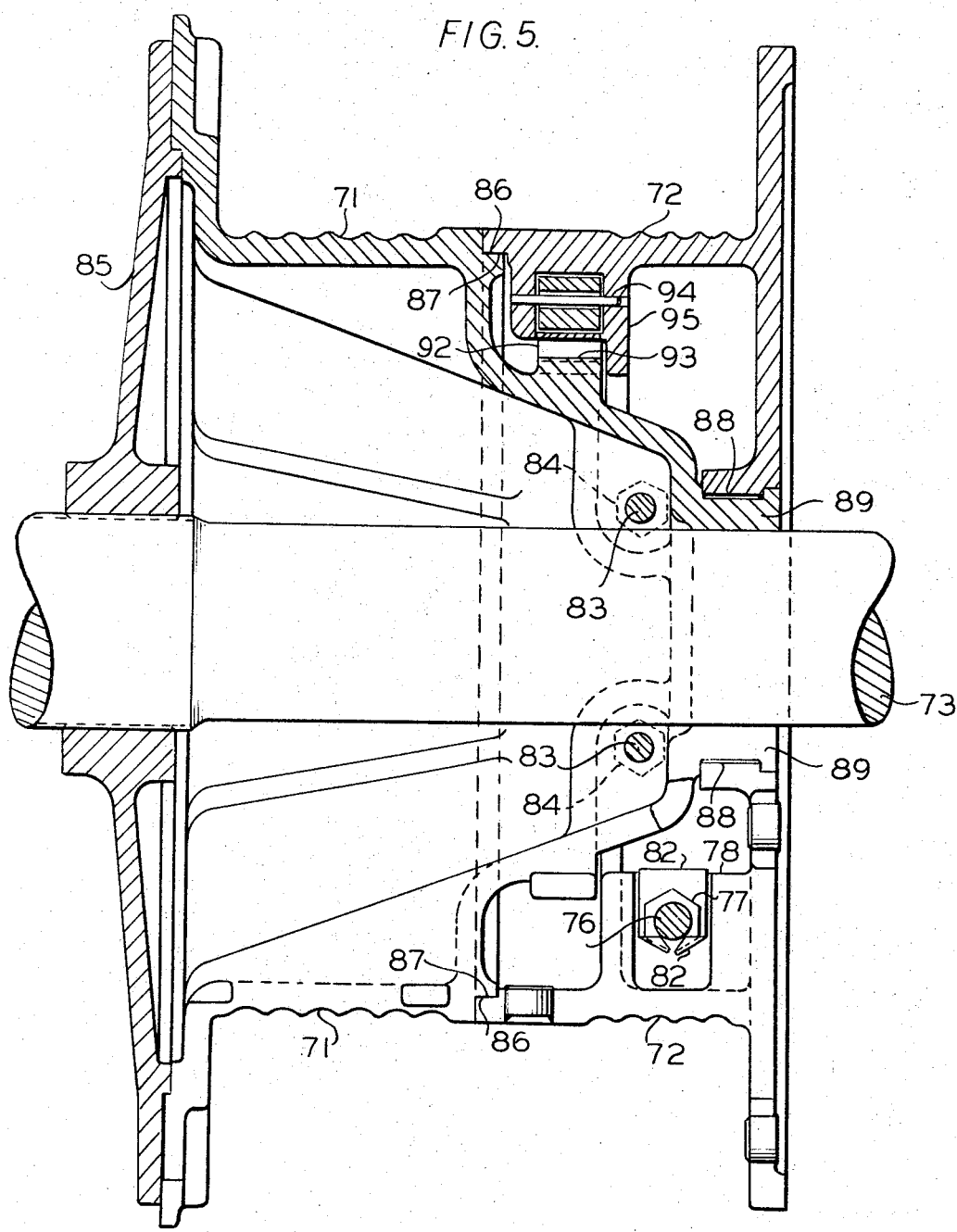

In the accompanying drawings forming a part of this specification and in which like reference characters are employed to designate like parts throughout the same, FIGURE 1 is a side elevational view showing a power shovel incorporating the invention, FIGURE 2 is a diagrammatic perspective view illustrating the reeving for the crowd and rerack cables, FIGURE 3 is an enlarged fragmentary top plan view, partly broken away, showing the spring loaded take-up apparatus with its visual indicator, FIGURE 4 is a side elevational view of the winding drum for the crowd and rerack cables as seen from the rerack reel side, FIGURE 5 is a fragmentary sectional view taken on line 5—5 of FIG. 4, FIGURE 6 is an enlarged fragmentary side view showing one of the spring loaded locking pawls, FIGURE 7 is a fragmentary side view of the pawl mechanism and its associated remotely located control for holding the rerack reel stationary during the tightening process, and FIGURE 8 is a fragmentary top view of the pawl mechanism and control illustrated in FIG. 7.

In the drawings, wherein for the purpose of illustration is shown a preferred embodiment of this invention, and first particularly referring to FIG. 1, there is illustrated a vehicle body 11 rotatably mounted on the vehicle undercarriage 12. A drive engine, not shown, is located in the vehicle body to provide power for the various cable hoists and drums.

The foot of an inclined boom 14 is pivotally connected by shaft 15 to the front of the vehicle body 11. The head of the boom is raised and lowered by the boom hoist cable 16, one end of the cable being anchored to a frame 17 mounted on the vehicle body 11, and the other end of the cable being trained over the rotatably mounted sheaves 18 and 19 and then wound around and secured to the boom hoist winch 22.

A bucket 23 is mounted on a dipper stick 24 which is supported on the boom 14 for reciprocating longitudinal movement through a saddle block 25 which is mounted for pivotal movement with respect to the boom 14 by a shipper shaft 26. Hoisting and lowering the bucket 23 is controlled by the hoist cable 27 which is trained over the sheaves 28 rotatably mounted on the head of boom 14, and then around sheave 29 which is rotatably mounted on the bail 31 of the bucket. One end of the hoist cable 27 is wound around and secured to the bucket hoist winch 33, and the opposite end is anchored to a stationary point on the boom 14.

A crowd cable 35 and a rerack cable 36 are oppositely wrapped about a drum assembly 37 so as one cable is wound onto the drum assembly an equal length of the other cable is simultaneously payed off the drum assembly.

Referring to FIG. 2, crowding out of the dipper stick 24 is accomplished by applying tension to the crowd cable 35. This cable 35 has one end anchored to plate 38 of the saddle block 25. The cable 35 is then trained around crowd sheave 39 which is rotatably supported on the dipper stick 24, thence around sheave assembly 41 which is rotatably supported on shipper shaft 26. From the sheave assembly 41, the cable 35 passes downwardly along the boom and under the sheave 42 on the shaft 15, and it is then wound around and secured to the drum assembly 37. Rotation of the drum assembly 37 in a direction to wind up the crowd cable 35 applies tension to the crowd cable thereby crowding out the dipper stick 24.

Reracking of the dipper stick 24 is effected by the rerack cable 36 which is anchored at one end to a moveable member 64 of the spring loaded take-up apparatus 47. The cable 36 is then routed around the rerack sheave 44 which is rotatably supported on the dipper stick 24, thence around sheave assembly 41 and drum 43 on the shipper shaft 26 and shaft 15 respectively, and it is then wound around and secured to the rerack reel 72 of the drum assembly 37 in a direction opposed to that referred to above releases the crowd cable 35 while simultaneously winding up and applying tension to the rerack cable 36 to rerack the dipper stick 24.

The spring loaded take-up apparatus 47 is illustrated in FIG. 3 with the coil springs 55 being shown in their expanded positions. Each L-shaped bracket 48 is welded at its ends to the associated plates 38 and 49 of the saddle block 25, and along its longitudinally extending bottom edge to the side 51 of the saddle block 25 as illustrated in FIG. 1. Bolts 52 and nuts 53 secure the end housing 54 to the plate 38.

Each coil spring 55 is maintained centered in its respective channel 56 by a cylindrical tube 57 which extends through the center of each coil spring and is mounted in a fitted engagement with a bushing 58 which is welded to each support 59. Each support 59 is permanently affixed in place by being welded to its respective bracket 48. A rod 61 with a nut 62 on one end thereof extends through the aperture 63 at each side of a member 64, and thence through each support 59, bushing 58, tube 57, and coil spring 55. A nut 66 is fastened onto each rod 61 to compress its associated coil spring 55 between a washer 67 and a support 59. The end of the rods then project through the apertured end plate 65 of the end housing 54.

To compress the springs 55, the crowd cable 35 is wound onto the drum assembly 37 causing the dipper stick 24 to crown outward while the rerack cable 36 is prevented from unwinding in a manner that will be later described. This outward movement of the dipper stick 24 causes the rerack cable 36 to pull member 64 longitudinally outward in channels 56 thereby removing the slack from both the crowd and rerack cables. The outward movement of member 64 causes longitudinal movement of rods 61 resulting in a compression of each coil spring 55 between its associated support 59 and washer 67. These coil springs 55 act to automatically pull member 64 longitudinally inward as the crowd and rerack cables 35 and 36 stretch with use, thus maintaining the tension in the cables between periods of tightening. The projection 68 of each rod 61 from the housing 54 acts as a visual guide to the shovel operator to indicate when the crowd and rerack cables 35 and 36 have been tightened to their proper tension and the coil springs 55 compressed to a maximum degree. Upon completion of the tightening procedure, the rerack cable 36 is released for winding and unwinding movements opposite those of the crowd cable 35 and the shovel is returned to normal operation.

It can be seen in FIGS. 4 and 5 that the drum assembly 37 is divided intermediate its ends so as to provide a crowd reel 71 and a rerack reel 72 at opposite ends thereof. It is also to be noted that both the crowd reel 71 and the rerack reel 72 of the drum assembly 37 are longitudinally split to allow the reels to be readily assembled on or disassembled from the shaft 73.

The split halves of the crowd reel 71 are fastened together on the shaft 73 by bolts 83 inserted through adjacent apertures in each half of the crowd reel and secured by nuts 84. The assembled crowd reel 71 is then connected to the shaft 73 by an adapter plate 85 being splined onto the shaft 73 and bolted along its periphery to the periphery of the crowd reel 71.

The two halves 74 and 75 of the rerack reel 72 are fastened together on the crowd reel 71 by studs 76. Each stud 76 has a nut 77 formed thereon intermediate its ends. One end of each stud 76 is passed loosely through an apertured flange 78 on the rerack reel half 74 and is prevented from being removed by a nut 79 being threaded on and welded to the stud. The other threaded end of each stud 76 is axially aligned with a threaded aperture 80 in a flange 81 on the rerack reel half 75 so that rotation of nut 77 threads the stud 76 into the aperture 80 thereby securing the two halves 74 and 75 together to form the assembled rerack reel 72. After assembling the rerack reel 72 the ends of each clip 82 are bent downwards over nut 77 to prevent the accidental loosening of the stud 76.

The rerack reel 72 is rotatably supported on the crowd reel 71 with its shoulder 86 abutting against a rim bearing surface 87 on the crowd reel and its inwardly projecting collar 88 fitting into and retained by a grooved collar 89 on the crowd reel. It can therefore be seen that the coaxially mounted crowd reel 71 and rerack reel 72 of the drum assembly 37 are capable of relative rotation with respect to each other.

During the normal operation of the power shovel the two reels 71 and 72 are forced to operate as a unit by a spring loaded pawl 92 (see FIG. 6) which engages the ratchet teeth 93 on the crowd reel 71. The pawl 92 is pivotally connected by roll pin 94 to the side walls of an inwardly projecting pocket 95 on the inside of the rerack reel 72. The size of the hole in the pawl 92 through which the roll pin 94 passes is sufficiently large to permit the pawl to bear against the inner end of the pocket 95 so that forces transmitted to the pawl by the teeth 93 will not be applied to the roll pin.

One end of a spring 96 is inserted into the recess 97 in the shoulder like projection 98 of the pawl 92, and the other end is inserted into the recess 99 on the inside of the rerack reel 72. This spring 96 acts to maintain the engagement of the pawl 92 with the ratchet teeth 93 in a manner to prevent the opposite rotation of the reels 71 and 72 in directions to simultaneously release the tension in both the crowd and rerack cables 35 and 36. A cap screw 101 is inserted through slot 102 in the rerack reel 72 and is threaded into aperture 103 in pawl 92. By threading the cap screw 101 into and out of the pawl 92 it is possible to disengage and reengage, respectively, the pawl and the ratchet teeth 93. This cap screw 101 is used during the assembly or disassembly of the drum assembly 37, and also when the cables 35 and 36 are replaced or the bucket attachment 23 is removed, and it is completely removed from the slot 102 when it is not in use.

An additional pawl system 104 which is of an identical construction to that described above may also be used in conjunction with pawl 92. This additional pawl system 104 is so located that it will be in operative engagement with the ratchet teeth 93 to prevent the relative rotation of the reels 71 and 72 at those points when the pawl 92 is midway between two ratchet teeth. This permits a finer tension adjustment of the crowd and rerack cables 35 and 36 during the tightening process.

As has been previously mentioned, it is necessary to hold the rerack reel 72 in a stationary position to prevent the unwinding of the rerack cable 36 during the tightening of the cables 35 and 36. This is effected by providing a manually operated pawl 105 (see FIGS. 7 and 8) to engage one of the recesses 106 located on the periphery of the rim of the rerack reel 72.

A pawl operating member 107 is fixedly connected to the pawl 105 by a rotatably supported pin 108 so that forward movement of member 107 will cause the pawl to rotate in a direction to come into engagement with an adjacent one of the recesses 106, and rearward movement of the member 107 will cause the pawl to be disengaged from the recess and held in an inoperative position.

A coil spring 109 is supported on a shaft 111 and is in effect compressed between the pawl operating member 107 and a mounting bracket 112 which is bolted onto a member 113 of the vehicle body 11. One end of the spring 109 is fitted over the smaller end portion of a shouldered bushing 114 which is welded onto an apertured end plate 115 of the mounting bracket 112. The spring 109 is maintained in position by a cylindrical tube 116 which extends through the center of the spring and is mounted to the bushing 114. The other end of the spring 109 is fitted over the smaller end portion of a shouldered bushing 117 which is slidable on the shaft 111 and is urged against the nut 118 by the spring. A bracket 119 is pivotally connected by a pin 121 to the pawl operating member 107 and is threaded onto the end of the shaft 111 which is locked in a fixed position relative thereto by the nut 118. The opposite end of the shaft 111 is inserted through the tube 116, bushing 114 and end plate 115. The tension of spring 109 is adjusted by rotating nut 118 along the threaded shaft 111 thereby either expanding or compressing the spring between bushings 114 and 117.

A slot 122 is located in the end of the pawl operating member 107 opposite its connection to the pin 108. The two legs of a U-shaped bracket 123 are connected at their extremities by a pin 124 which extends therethrough and through the slot 122. A flexible member 125 is threaded into the U-shaped bracket 123 and is secured by a nut 126. The flexible member 125 extends from the bracket 123 through a protecting sheath 127 to an operating handle 128 mounted on a control panel 129 in the vehicle body 11.

To engage the pawl 105 the operator of the power shovel pushes in the handle 128 thereby imparting a longitudinal forward movement to the flexible member 125. This movement of the flexible member 125 urges the pin 124 forward in slot 122 thereby releasing the pawl operating member 107 and allowing the previously compressed spring 109 to expand and rotate the pawl operating member in a forward direction. This rotation will cause the pawl 105 to rotate in a forward direction to come into engagement with one of the recesses 106. Retracting handle 128 reverses this procedure by causing the rearward movement of the pawl operating member 107 thereby removing the pawl 105 from engagement with the recesses 106 while at the same time compressing the spring 109 for future use.

To tighten the crowd cable 35 the bucket 23 is first rested on the ground so as to remove all of the load from the cables. The operator then depresses handle 128 releasing pawl 105 for movement by the spring 109 into a position of engagement with an adjacent one of the recesses 106 to hold the rerack reel 72 stationary and thereby prevent the rerack cable 36 from being payed off the drum assembly 37. By engaging gear 131, see FIG. 2, with the drive engine, not shown, the crowd reel 71 is caused to rotate in a direction to wind up the crowd cable 35. This crowds out the dipper stick 24, and since no rerack cable 36 is being released as the crowd cable 35 is being wound onto the crowd reel 71, this winding in of the crowd cable tightens the crowd and rerack cables. As previously discussed, the projections 68 of the spring loaded take-up 47 visually indicate to the operator when to stop the tightening procedure to avoid overtightening and damaging the cables 35 and 36. During the tightening process the pawls 92 and 104 automatically engage successive ratched teeth 93 as the crowd reel 71 is rotated relative to the rerack reel 72. These pawls 92 and 104 allow relative rotation between the reels 71 and 72 in one direction only thereby prevent the rotation of the reels in a direction to simultaneously release the tension in both cables 35 and 36. After the cables 35 and 36 are tightened, the operator merely retracts handle 128 to disengage pawl 105 from the recesses 106 of the rerack reel 72, and the shovel is ready for use.

Some outstanding advantages of this invention are the provision for tightening the crowd cable 35 and rerack cable 36 by using the drive engine of the power shovel, and being able to completely control the tightening procedure from the operator's position. This allows a previously tedious and time consuming task to be completed in a minimum of time by the shovel operator. The spring loaded take-up apparatus 47 provides for the automatic tightening of the cables between the powered tightenings, and the associated rod projections 68 serve to visually indicate to the shovel operator when the cables have been properly tightened. This visual indication prevents the power shovel operator from over tightening the cables.

It is to be understood that the form of this invention herewith shown and described is to be taken as a preferred example of the same, and that various changes in the shape, size, and arrangement of parts may be resorted to without departing from the spirit of the invention or the scope of the subjoined claims.

Having thus described the invention, we claim:

1. In a power shovel having a dipper stick supported for reciprocating longitudinal movement, and flexible means extending in opposite directions from the position at which the dipper stick is supported and operatively connected to longitudinally spaced points on said dipper stick so that tension alternately applied to the ends of the flexible means remote from the operative connections to the dipper stick will effect reciprocating movements of the dipper stick, the improvement comprising:
   drum means rotatably mounted on said power shovel and providing separate reels,
   the ends of said flexible means remote from the operative connections to the dipper stick being wound around said separate reels and secured thereto so that rotation of both reels in one direction will apply tension to one associated end of said flexible means while simultaneously releasing the other associated end of the flexible means, and rotation of both reels in the opposite direction will release said one associated end of the flexible means and will apply tension to said other associated end of the flexible means,
   said reels being operatively connected to each other in a manner to positively prevent rotation of either reel relative to the other in a direction to simultaneously release the tension in the associated ends of said flexible means,
   means for rotating said reels as a unit alternately in opposite directions to effect reciprocating movement of said dipper stick, and
   means for selectively temporarily holding one of said reels stationary while said rotating means rotates the other said reel relative thereto in a direction to increase the tension in said flexible means.

2. Apparatus as described in claim 1 further characterized by said drum means comprising:
   a rotatably mounted drum, and
   said drum being divided intermediate its ends to provide two coaxially mounted separate reels.

3. Apparatus as described in claim 1 further characterized by said connection between said reels comprising:
   means having a first member and a second member rotatable relative to each other in one direction only,
   said first member being secured to one of said reels,
   said second member being secured to the other of said reels, and
   said members preventing relative rotation of said reels in a direction to simultaneously release the associated ends of said flexible means while allowing relative rotation of said reels in a direction to tighten said flexible means.

4. A device as described in claim 3 and further characterized by said first and second members comprising:
   ratchet teeth concentrically located on one of said reels,
   a pawl secured to the other of said reels in a position to engage said ratchet teeth, and
   said pawl having resilient means associated therewith to urge the pawl into a position of engagement with said ratchet teeth.

5. Apparatus as described in claim 1 further characterized by said temporary holding means comprising:
   a member movable between an operative position in rotation preventing engagement with one of said reels and an inoperative position at which the reel is free to rotate in either direction, and
   remotely located operator controllable means for selectively moving said member between its operative and inoperative positions.

6. A device as described in claim 1 further characterized by said temporary holding means comprising:
   circumferentially spaced recesses on one of said reels, said recesses each having a substantially radial abutment at one side,
   a pawl mounted adjacent said one reel for movement into an adjacent one of said recesses and into holding relationship with the abutment thereof to prevent rotation of the associated reel in one direction, and
   means controllable from the power shovel operators position for selectively moving said pawl into and out of said adjacent recess.

7. In a power shovel having a cab, a dipper stick supported for reciprocating longitudinal movement, and flexible cables extending in opposite directions from the position at which the dipper stick is supported and operatively connected to longitudinally spaced points on said dipper stick so that tension alternately applied to the ends of the flexible cables remote from the operative connections to the dipper stick will effect reciprocating movements of the dipper stick, the improvement comprising:

drum means rotatably mounted on said power shovel and providing separate reels, the ends of said flexible cables remote from the operative connections to the dipper stick being wound in opposite directions around said separate reels and secured thereto so that rotation of both reels in one direction will apply tension to one of said flexible cables while simultaneously releasing the other said flexible cable, and rotation of both reels in the opposite direction will release said one flexible cable and apply tension to said other flexible cable, said reels being operatively connected to each other in a manner to prevent rotation of the reels in a direction to simultaneously release the tension in both of the flexible cables, powered means for rotating said reels as a unit alternately in opposite directions to effect reciprocating movement of said dipper stick, means for temporarily holding one of said reels stationary while said rotating means rotates the other said reel in a direction to tighten the end of said flexible cable associated with the latter reel until the tension in both of said flexible cables is at a selected value, and means associated with said flexible cables to indicate when said flexible cables are properly tensioned.

8. Apparatus as described in claim 7 further characterized by said temporary holding means comprising:

a member moveable between an operative position in rotation preventing engagement with one of said reels and an inoperative position at which the reel is free to rotate in either direction, and operator controllable means located in said cab of the power shovel for selectively moving said member between its operative and inoperative positions.

9. Apparatus as described in claim 7 further characterized by one end of one of said flexible cables being resiliently operatively connected to said dipper stick so as to automatically take up the slack in the flexible cables between the periods of tightening said flexible cables.

10. Apparatus as described in claim 9 further characterized by said indicating means comprising:

means visible from the cab of said power shovel and associated with said resilient means to indicate when said flexible cables have been properly tensioned.

11. A device as described in claim 10 further characterized by said indicating means comprising:

a first member associated with the end portion of said flexible cable secured to a moveable member by said resilient means for movement with the cable, and a second member mounted in a fixed position relative to said first member, the position of said first member relative to said second member visually indicating the degree to which said resilient means is deformed from an initial condition.

References Cited

UNITED STATES PATENTS

| 796,720 | 8/1905 | Hanscom | 254—172 |
| 2,498,321 | 2/1950 | White et al. | 214—135 |
| 3,037,649 | 6/1962 | Bauer et al. | 214—135 |

HUGO O. SCHULZ, *Primary Examiner.*